United States Patent [19]

Sikkema

[11] Patent Number: 5,242,149

[45] Date of Patent: Sep. 7, 1993

[54] ELECTROHYDRAULIC PILOT VALVE

[75] Inventor: Jeffrey A. Sikkema, Searcy, Ark.

[73] Assignee: Vickers Incorporated, Troy, Mich.

[21] Appl. No.: 933,179

[22] Filed: Aug. 21, 1992

[51] Int. Cl.⁵ .................... F16K 31/02; F16K 39/00
[52] U.S. Cl. .................... 251/129.07; 251/129.15; 251/282
[58] Field of Search ................ 251/129.07, 129.15, 251/282

[56] References Cited

U.S. PATENT DOCUMENTS

| | | | |
|---|---|---|---|
| 2,831,650 | 4/1958 | Richardson | 251/129.07 |
| 3,442,485 | 5/1969 | Reynolds | 251/282 |
| 3,648,968 | 3/1972 | Reid et al. | 251/282 |
| 4,029,293 | 6/1977 | Meysenburg | 251/282 |
| 4,252,296 | 2/1981 | Berg | 251/282 |

Primary Examiner—A. Michael Chambers
Attorney, Agent, or Firm—Barnes, Kisselle, Raisch, Choate, Whittemore & Hulbert

[57] ABSTRACT

An electrohydraulic pilot valve that includes a valve spool movably mounted within a valve body for selectively coupling a valve inlet to a valve outlet. A solenoid is mounted on the valve body for applying a force to one end of the spool as a function of an electronic control signal. A pair of fluid restrictions are connected between the valve outlet and a fluid pressure sump effectively to form a pressure divider, from which fluid is fed back to the opposing end of the valve spool.

4 Claims, 1 Drawing Sheet

ELECTROHYDRAULIC PILOT VALVE

The present invention is directed to electrohydraulic systems for feeding hydraulic fluid under pressure from a source to a load as a function of electronic control signals, and more particularly to an electrohydraulic pilot valve system adapted to supply increased fluid output pressure while maintaining or reducing electrical power consumption.

BACKGROUND AND OBJECTS OF THE INVENTION

The current trend in design of electrohydraulic systems, particularly systems for use in mobile applications such as construction equipment, is toward the use of electrohydraulic pilot valves that operate the main system control valve. In systems of this type, an electrical signal from a controller, which may be an operator controller and/or a microprocessor-based automated controller, is supplied to the pilot valve. The output from the pilot valve is in the form of hydraulic fluid pressure that is proportional to the input control signal. This output pressure may be connected to the control ports of a hydraulic load, such as a hydraulic control valve. The electrohydraulic pilot valve may be provided in the form of a stand-alone valve disposed remotely of the load and connected thereto by suitable fluid lines, or may be incorporated into or mounted on the housing of the hydraulic load.

Conventional electrohydraulic pilot valves typically include a spool movably mounted within a valve body for variably coupling the valve inlet to the valve outlet. An electrical solenoid is mounted on or within the valve body, and is responsive to the electrical control signals for applying a variable pressure to one end of the spool. Valve outlet pressure is fed back to the opposing end of the spool. This pressure acts on the effective area of the spool, creating a force opposing the solenoid. Pilot valve outlet pressure is therefore a function of the input force applied by the solenoid, which in turn is a function of magnitude of the control signal applied to the solenoid.

There is a desire and need in the art for pilot valves of the described character that are capable of supplying increased pilot output pressure while maintaining or reducing electrical power consumption. Output pressure is a function of spool diameter and solenoid force. In order to boost output pressure in conventional valve constructions, either the spool area must be reduced or the solenoid output force must be increased. Increased solenoid force typically necessitates increased electrical power consumption, which in turn implies increased costs and is therefore not desirable. On the other hand, decreasing spool diameter would increase manufacturing cost, and would also deleteriously affect dynamic performance characteristics because of the consequent reduction in flow area.

It is therefore a general object of the present invention to provide an electrohydraulic system, and particularly an electrohydraulic pilot valve system, that obtains increased fluid outlet pressure while maintaining or reducing electrical power consumption. A further object of the present invention is to provide an electrohydraulic valve of the described character that obtains the foregoing objective without significant increase in manufacturing costs, and while maintaining or improving dynamic performance characteristics of the valve.

SUMMARY OF THE INVENTION

In an electrohydraulic pilot valve in accordance with a presently preferred embodiment of the invention, a valve spool is movably positioned within a valve body for selectively feeding hydraulic fluid from an inlet to an outlet as a function of position of the spool within the body. A solenoid is mounted on the valve body, and is responsive to electrical control signals for applying pressure to one end of the spool. A feedback passage couples the opposing end of the spool to the fluid outlet, such that position of the spool within the valve body and hydraulic fluid pressure at the valve outlet are determined by a pressure balance on the spool between such feedback fluid and the solenoid.

In accordance with the distinguishing feature of the present invention, a first restriction is placed in the hydraulic fluid feedback path between the valve outlet and the spool end for restricting flow of hydraulic fluid therethrough, and a second restriction couples the spool end to a fluid pressure sump. These first and second restrictions, which may comprise suitably sized orifices, function as a pressure divider, so that fluid pressure applied to the valve spool varies as a fractional function of fluid pressure at the pilot valve outlet. Thus, for a given valve outlet pressure, feedback pressure on the valve spool is reduced, requiring reduced force from the solenoid valve to maintain that valve outlet pressure. On the other hand, for a given electrical control signal magnitude and consequent solenoid force, the pilot valve outlet pressure is greatly increased.

BRIEF DESCRIPTION OF THE DRAWING

The invention, together with additional objects, features and advantages thereof, will be best understood from the following description, the appended claim and the accompanying drawing in which:

DETAILED DESCRIPTION OF THE PREFERRED EMBODIMENT

Figure 1:
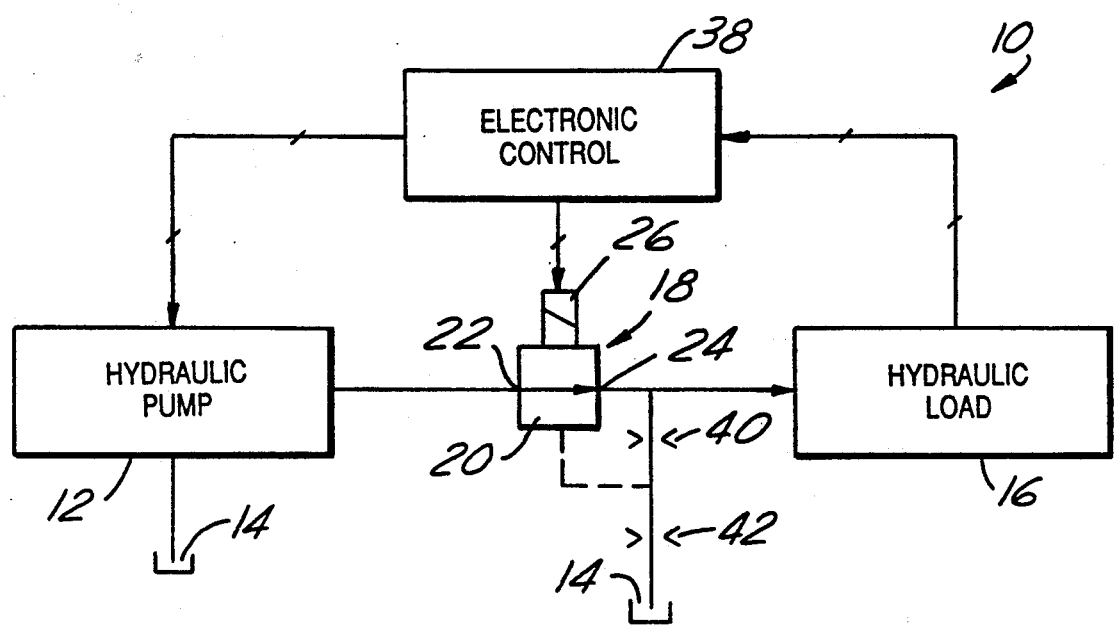
FIG. 1 is a schematic diagram of an electrohydraulic control system in accordance with the present invention.
Figure 2:
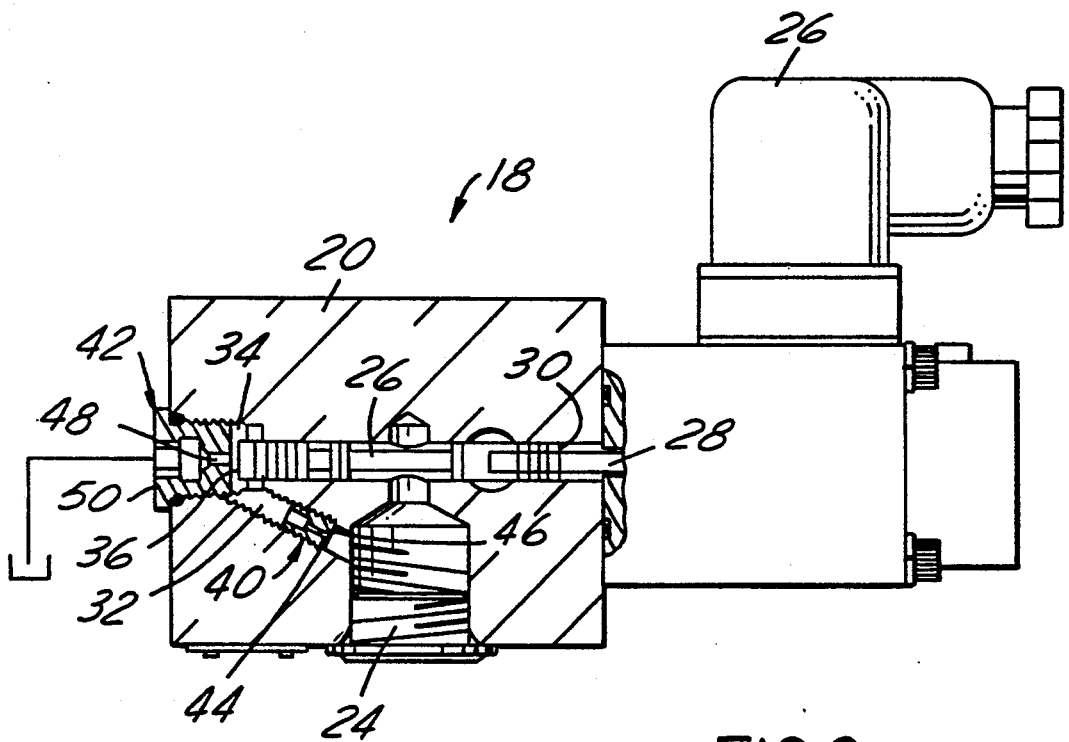
FIG. 2 is a partially sectioned elevational view of an electrohydraulic pilot valve in accordance with a presently preferred embodiment of the invention employed in the system of FIG. 1.

FIG. 1 illustrates an electrohydraulic control system 10 as comprising a hydraulic pump 12 for feeding fluid under pressure from a sump 14 to a hydraulic load 16, such as a main system hydraulic valve, a hydraulic motor, etc. An electrohydraulic pilot valve 18 is interposed between pump 12 and load 16 for controlling application of fluid pressure to the load. Referring to both FIGS. 1 and 2, valve 18 includes a valve body 20 having an inlet 22 coupled to pump 12 and an outlet 24 coupled to load 16. A valve spool 26 is mounted within valve body 20 for variably coupling inlet 22 to outlet 24. An electrical solenoid 26 is mounted on valve body 20, and has a electrical coil or the like (not shown) responsive to electronic control signals for applying a variable force on a solenoid pin 28. Pin 28 extends into body 20 to apply such force against one end 30 of spool 26.

A feedback passage 32 couples valve outlet 24 to a cavity 34 that surrounds the opposing end 36 of spool 26 so as to apply to spool end 36 a pressure that varies as a function of valve outlet pressure. Thus, position of spool 26 within valve body 20 is determined by a pressure balance between solenoid force on spool end 30 and fluid pressure on spool end 36, and thus as a function of the electrical control signal applied to solenoid 26. Such electrical control signal may be provided by a suitable electronic controller 38, which may comprise an operator-responsive joystick controller, for example, and/or a microprocessor-based controller responsive to feedback signals from load 16 for automatically controlling pilot valve 18 and/or controlling displacement of pump 12. To the extent thus far described, valve 18 and system 10 are of generally conventional construction.

In accordance with the present invention, a pair of fluid restrictions 40,42 are connected in series between valve outlet 24 and fluid pressure sump 14 so as to form, in effect, a fluid pressure divider between the pilot valve outlet pressure and the sump. Fluid pressure cavity 34 (FIG. 2) surrounding spool end 36 is effectively connected to the junction of divider restrictions 42,44, so that fluid pressure applied to the spool end varies as a direct but fractional function of fluid pressure at valve outlet 24. In the preferred embodiment of the invention illustrated in FIG. 2, restriction 40 takes the form of an orifice 46 that extends through a plug 44 threaded into feedback passage 32 in valve body 20. Restriction 42 takes the form of an orifice 48 that extends through a plug 50 threaded into cavity 34. In one operating embodiment of the invention illustrated in FIG. 2, orifice 46 is of 0.025 inch diameter, and orifice 48 is of 0.025 inch diameter, thereby effectively dividing or reducing the feedback pressure by the fraction of one-half of the outlet pressure. This, in turn, amplifies the output pressure of the valve. This valve is capable of obtaining a fluid outlet pressure of approximately 800 psi at a solenoid power of 18 watts, as compared with an outlet pressure of 400 psi at the same power consumption for a similar pilot valve of otherwise conventional construction.

I claim:

1. An electrohydraulic pilot valve system that comprises:

a pilot valve having a valve body with a fluid inlet and a fluid outlet, a valve spool movably disposed within said valve body, first passage means within said body and coupled to said spool for selectively feeding fluid from said inlet to said outlet as a function of position of said spool within said body, and feedback passage means within said body coupled to said first passage means for feeding fluid from said outlet to one end of said spool, a solenoid including means coupled to an opposing end of said spool responsive to electronic control signals for applying pressure to said opposing spool end, such that position of said spool within said body and flow of fluid from said inlet to said outlet are determined by a pressure balance on said spool between fluid pressure from said feedback passage means on said one spool end and pressure from said solenoid on said opposing spool end, a first orifice in said feedback passage means for restricting flow of fluid through said feedback passage means, and second passage means including a second orifice for feeding fluid from one end of said spool to a fluid pressure sump while restricting flow of fluid therethrough, said first and second orifices being thereby connected in series between said outlet and the sump for dividing fluid pressure applied to said one end to a fraction of fluid pressure at said outlet.

2. An electrohydraulic system for feeding hydraulic fluid from a source to a load comprising:

a pilot valve that includes a spool, first passage means coupled to said spool for feeding hydraulic fluid through said first passage means from the source to the load as a function of position of said spool within said valve, and feedback passage means coupled to said first passage means for applying hydraulic fluid to one end of said spool, means coupled to said spool for selectively controlling position of said spool within said valve, a first orifice in said feedback passage means for restricting flow of fluid through said feedback passage means, and second passage means including a second orifice for feeding fluid from one end of said spool to a fluid pressure sump while restriction flow of fluid to said sump, such that said first and second orifices operate to reduce pressure on said one end of said spool to a fraction of fluid pressure at said first passage means determined by relative sizes of said first and second orifices.

3. The system set forth in claim 2 wherein said second passage means and said second orifice restricting fluid flow through said second passage means are both disposed on said valve.

4. The system set forth in claim 3 wherein said means coupled to said spool comprises an electrical solenoid responsive to electronic control signals for selectively positioning said spool within said valve.

* * * * *